W. M. REESE.
RESILIENT VEHICLE WHEEL.
APPLICATION FILED NOV. 13, 1911.

1,063,594.

Patented June 3, 1913.

Witnesses
Harry A. Brooks
W. M. Gentle

Inventor
William M. Reese
By
his Attorney

UNITED STATES PATENT OFFICE.

WILLIAM M. REESE, OF LOS ANGELES, CALIFORNIA.

RESILIENT VEHICLE-WHEEL.

1,063,594.  Specification of Letters Patent.  Patented June 3, 1913.

Application filed November 13, 1911. Serial No. 660,157.

*To all whom it may concern:*

Be it known that I, WILLIAM M. REESE, a citizen of the United States of America, residing at Los Angeles, in the county of Los Angeles, State of California, have invented a certain new and useful Resilient Vehicle-Wheel; and I do hereby declare the following to be a full, clear, and exact description of the invention, such as will enable others skilled in the art to which it appertains to make and use the same.

This invention relates to improvements in resilient vehicle wheels, and it may be said to consist in the provision of the novel features and in the novel and improved construction, arrangement and combination of parts and devices as will be apparent from the description and claims which follow.

One object of the invention is to provide a novel and improved construction for a vehicle wheel to form a tire having an outer casing of metal and a plurality of pneumatic cushioning parts interposed between relatively movable overlapping parts of said casing.

Another object of the invention is to provide a novel and improved vehicle wheel formed with a metallic tread part and means to pneumatically cushion said tread part in a highly effective manner.

A further object of the invention is to provide a novel and improved vehicle wheel formed with a metallic tread part and a pneumatic cushion therefor made in sections so that pressure exerted at any point on the exterior of the tread is effectively resisted by pressure of the air in the sections adjacent to said point.

A further object of the invention is to provide a novel and improved metallic tire for a vehicle wheel in which bags containing air under pressure are arranged to have the air exert substantially uniform resistance to exterior pressure on the metallic tread at all points of contact of the latter with the ground.

Further objects of the invention are to provide a novel and improved resilient vehicle wheel which is puncture-proof, simple in construction, durable and effective in use, and in which the parts of the tire may be readily assembled or demounted.

Other objects and the advantages of the invention will be apparent to those skilled in the art from a consideration of the following description of the preferred form of construction embodying it, taken in connection with the accompanying drawings in which—

Figure 1:
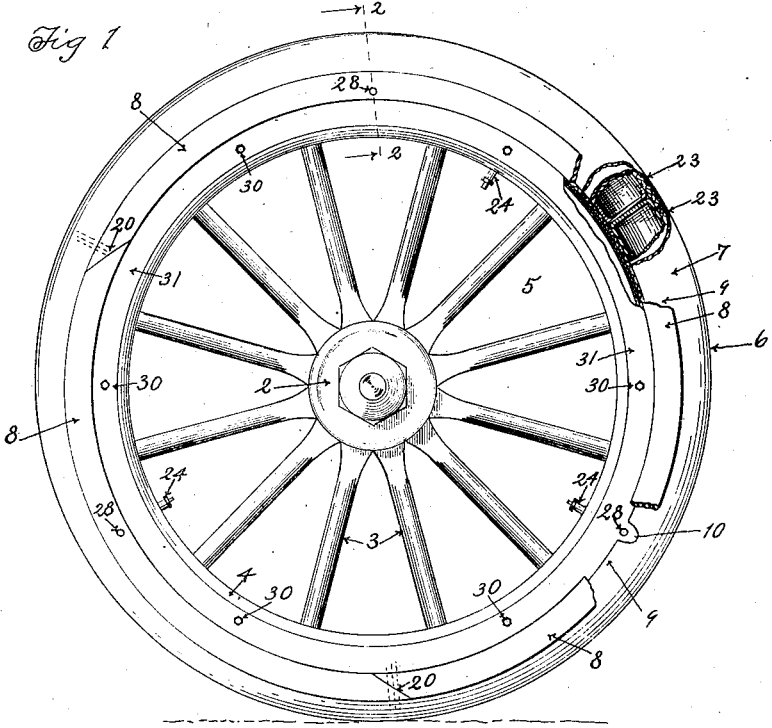
Figure 3:
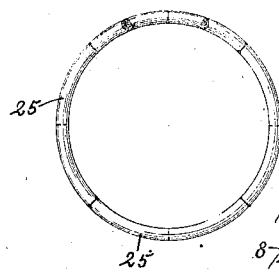
Figure 2:
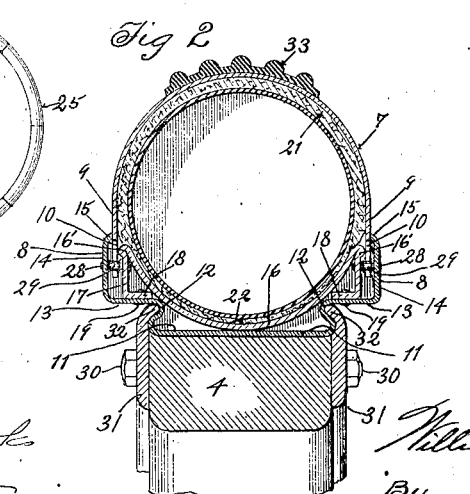

Figure 1 is a partly broken side elevation of a vehicle wheel having the invention applied thereto; Fig. 2 is a view taken on the line 2—2 of Fig. 1; Fig. 3 is a view to illustrate an alternative arrangement of the air bags, and Fig. 4 is a partial longitudinal sectional view of the tire showing a modification.

The hub 2, spokes 3, and felly 4 of the resilient vehicle wheel 5 may be of any suitable or approved construction. The tire 6 of the wheel may comprise an outer casing of metal, made up of the movable tread part 7 which overlaps the stationary parts 8 affixed on the felly 4, and a plurality of pneumatic cushioning parts interposed between the tread part 7 and the parts 8 of the outer casing. The tread part 7 is preferably made of one piece of steel plate formed circular and provided with spaced side flanges 9 having substantially arc-shaped recesses 10 therein. The parts 8 affixed on the felly 4 may each consist of a piece of sheet metal formed with a portion 11 adapted to fit on the felly 4 and a flange portion at each side of the portion 11 shaped to provide the hollow inner bead 12, the lateral offset 13, and the offset 14 at right angles to the offset 13. The offsets 14 overlap the flanges 9 and may have the edge portion 15 bent inwardly to guide the flanges 9. In each of the parts 8 of the outer casing is arranged a bedplate formed to provide a circular portion 16 adapted to bear against the portion 11 and beads 12 of the parts 8, and with guide portions 16' for the flanges 9 and with side flanges 17 spaced from and substantially in parallel with the flanges 14; the flanges 17 each having an offset 18 secured by means of bolts 19 to the lateral offsets 13 of the parts 8. To facilitate assembling the parts of the outer casing, the parts 8 together with the bedplates therein preferably have adjacent ends 20 thereof cut in the arc of a circle with the center at the inner edge of the preceding of the adjacent ends 20. On each of the bedplates in the parts 8 is arranged sheathing 21 of asbestos or other approved material having a slit 22 longitudinally thereof and adapted to be fitted between the bedplates and the tread part 7 of the outer casing, and on the interior of the sheathing 21 is arranged a bag 23, preferably of rubber, for containing air under pressure supplied through any suitable device, indicated at 24, connected with each bag. The parts 8 and bedplates therein are preferably made in three sections as it is found that with three of the bags 23 placed end to end, the air in the bags exert substantially uniform resistance to exterior pressure on the metallic tread at all points of contact of the latter with the ground. Though not so desirable the tire may be formed to permit the use of a double series of four bags 25 each, Fig. 3; the bags of one series being aside of and overlapping those of the other series by half lengths.

Figure 4:
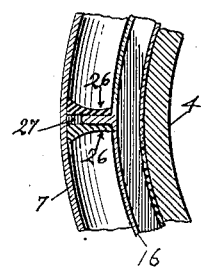

As shown in Fig. 4, the ends of the bags 23 may engage rubber blocks 26 extending between the bedplates and the tread part 7. The blocks 26 may be affixed to projections 27 on the bedplates; the projections 27 being of less length than the blocks 26 to permit movement of the tread part 7 toward the axis of the wheel. Pins 28 having rollers 29 thereon extend between the flanges 14 and 17 and are disposed to normally occupy a position substantially equally distant from the extremities of the recesses 10 in the end portion of the flanges 9, to permit free movement in all directions by the tread part 7. On each side of the felly 4 may be secured, by means of bolts 30, retaining plates 31 formed with a portion 32 adapted to fit into the hollow of the beads 12. If desired, an auxiliary tread 33 of rubber, leather, or the like, may be affixed to the metallic tread part 7. It will be seen that the parts of the tire may first be assembled by positioning the parts 8 on the underside of the tread part 7 and the parts then passed onto the felly 4 and secured in place by the retaining plates 31.

I claim:

1. An improved vehicle wheel comprising a felly, a one-piece metallic tread part having substantially arc-shaped recesses therein, stationary parts affixed on the felly and having flange portions overlapping the tread part, bedplates arranged in said stationary parts and provided with side flanges, said flange portions and said side flanges formed with portions to guide the tread part, the stationary parts and the bedplates therein having adjacent ends thereof cut in the arc of a circle with the center at the inner edge of the preceding of the adjacent ends, pins extending between the flange portions of the stationary parts and the side flanges of the bedplates and disposed in the recesses to be normally equidistant from the extremities of the recesses, and a plurality of bags for containing air under pressure interposed between said tread part and said bedplates.

2. An improved vehicle wheel comprising a felly, an outer casing including a one-piece metallic tread part and a plurality of stationary parts affixed to the felly, said stationary parts provided with flange portions and said tread part having substantially arc-shaped recesses therein and overlapping said flange portions on the stationary parts, bedplates in the stationary parts, said bedplates provided with side flanges, the stationary parts and the bedplates therein having adjacent ends thereof cut in the arc of a circle with the center at the inner edge of the preceding of the adjacent ends, pins extending between the flange portions of the stationary parts and the side flanges of the bedplates and disposed in the recesses to be normally equidistant from the extremities of said recesses, and a pneumatic cushion between said tread part and said stationary parts consisting of sheathed bags between the bedplates and said tread part, substantially as described.

3. An improved vehicle wheel comprising a felly, a plurality of stationary parts on the felly and each consisting of a piece of sheet metal formed with a portion adapted to fit on the felly and with flange portions on each side of and substantially at right angles to said portion, a metallic bedplate in each of said stationary parts, said bedplate formed with side flanges spaced from and substantially in parallel with the flange portions on the stationary parts, the stationary parts and the bedplates therein having adjacent ends thereof cut in the arc of a circle with the center at the inner edge of the preceding of the adjacent ends, a one-piece metallic tread part formed circular and provided with spaced side flanges extending into the space between the flange portions on the stationary parts and the side flanges on the bed plates and provided with substantially arc-shaped recesses therein, a plurality of bags for containing air under pressure interposed between said tread part and said stationary parts, and pins extending between the flange portions on the stationary parts and the side flanges on the bedplates and disposed to normally occupy a position substantially equally distant from the extremities of said recesses.

4. An improved vehicle wheel comprising a felly, a one-piece metallic tread part having substantially arc-shaped recesses therein, a plurality of stationary parts affixed on the felly and having flange portions overlapping the tread part, bedplates arranged in said stationary parts and provided with side flanges, the stationary parts and the bedplates therein having adjacent ends thereof cut in the arc of a circle with the center at the inner edge of the preceding of the adjacent ends, pins extending between the flange portions of the stationary parts and the side flanges of the bedplates and disposed in said recesses, a plurality of bags for containing air under pressure interposed between said tread part and said bedplates, and retaining plates secured to said felly and adapted to engage with said stationary parts, substantially as described.

5. An improved vehicle wheel comprising a felly, a plurality of stationary parts on the felly and each consisting of a piece of sheet metal formed with a portion adapted to fit on the felly and with side portions formed with lateral offsets and flanges substantially at right angles to said lateral offsets, metallic bedplates arranged in said stationary parts, said bedplates formed with side flanges secured to said lateral offsets and spaced from and substantially in parallel with the flanges on the stationary parts, the stationary parts and the bedplates therein having adjacent ends thereof cut in the arc of a circle with the center at the inner edge of the preceding of the adjacent ends, a one-piece metallic tread part formed circular and provided with spaced side flanges extending into the space between the flanges on the stationary parts and the side flanges on the bedplates and provided with substantially arc-shaped recesses therein, a plurality of pneumatic bags interposed between the tread part and the stationary parts, and pins extending between the flanges on the stationary parts and the side flanges on the bedplates and disposed in said recesses, substantially as described.

In testimony whereof, I have signed my name to this specification in the presence of two subscribing witnesses at Los Angeles, county of Los Angeles, State of California, this 7th day of November A. D. 1911.

WILLIAM M. REESE.

Witnesses:
 FRED W. MORRISON,
 ALEX. H. LIDDERS.